United States Patent [19]

Sato

[11] Patent Number: 4,630,070
[45] Date of Patent: Dec. 16, 1986

[54] LASER BEAM RECORDING APPARATUS

[75] Inventor: Yasushi Sato, Kawasaki, Japan

[73] Assignee: Canon Kabushiki Kaisha, Tokyo, Japan

[21] Appl. No.: 848,859

[22] Filed: Apr. 7, 1986

Related U.S. Application Data

[63] Continuation of Ser. No. 598,913, Apr. 10, 1984, abandoned.

[30] Foreign Application Priority Data

Apr. 18, 1983 [JP] Japan .................................. 58-68033

[51] Int. Cl.$^4$ ........................... G01D 9/42; G03B 4/00
[52] U.S. Cl. ......................................... 346/108; 354/4
[58] Field of Search .................. 346/107 R, 108, 160; 354/4, 5

[56] References Cited

U.S. PATENT DOCUMENTS

| | | | |
|---|---|---|---|
| 3,708,797 | 1/1973 | Solomon | 346/108 |
| 3,787,888 | 1/1974 | Haskal | 346/108 |
| 4,015,221 | 3/1977 | Dalton | 346/108 |
| 4,272,151 | 6/1981 | Balasubramanian | 346/108 |
| 4,278,981 | 7/1981 | Hill | 346/108 |

Primary Examiner—E. A. Goldberg
Assistant Examiner—Mark Reinhart
Attorney, Agent, or Firm—Fitzpatrick, Cella, Harper & Scinto

[57] ABSTRACT

A laser beam recording apparatus having a parallel-plane plate, such as a dust proof glass plate or a light controlling filter, which is disposed across the optical path of the laser beam. The beam transmitting surfaces of the parallel-plane plate are so inclined that the angle of incidence of the laser beam thereon is not zero throughout the scanning movement of the laser beam.

12 Claims, 5 Drawing Figures

FIG. I
PRIOR ART

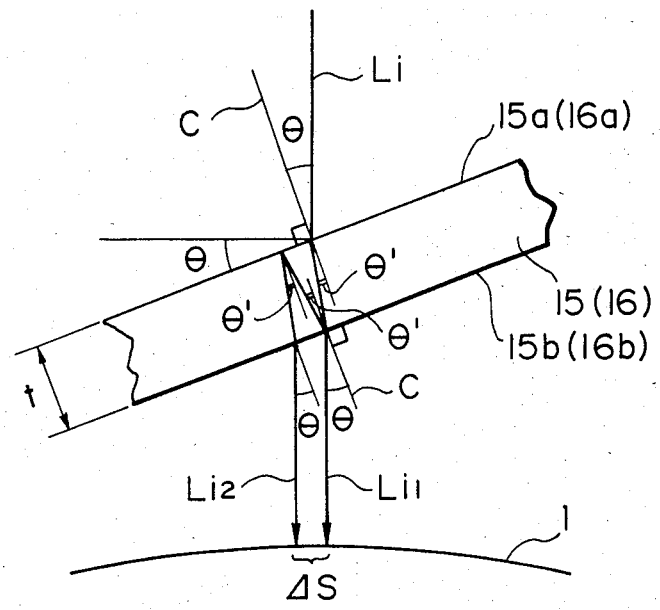
F I G. 4
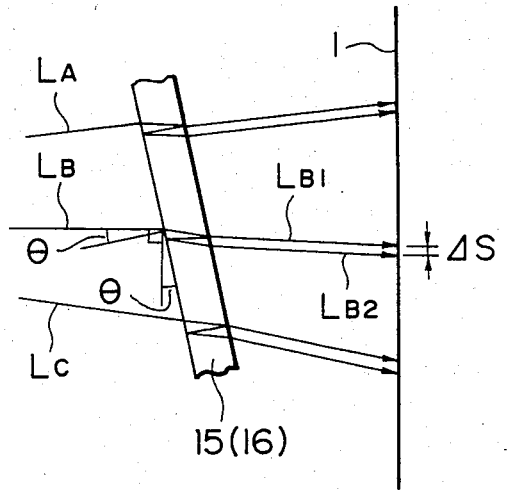
F I G. 5

LASER BEAM RECORDING APPARATUS

This application is a continuation of application Ser. No. 598,913 filed Apr. 10, 1984, now abandoned.

BACKGROUND OF THE INVENTION

The present invention relates to a laser beam recording apparatus, such as a laser beam printer, wherein a photosensitive member is scanned with a laser beam which is modulated in accordance with an image information to be recorded.

Conventional laser beam printer will first be described in conjunction with the accompanying drawing, FIG. 1.

The laser beam printer includes a photosensitive member 1, which is in the form of a drum, rotatable in the direction shown by the arrow. Around the photosensitive drum 1, there are provided a charger 2 for uniformly charging the surface of the photosensitive drum 1 and developing means 3 for developing an image on the photosensitive drum 1. The printer further includes a paper feed cassette 4, registration roller 6, an image transfer charger 7, image fixing means 8 and a cleaner 9.

The laser beam printer is provided with a housing 10 for accommodating an optical system for the laser beam L. The housing 10 contains a laser beam oscillator 11 which generates a laser beam L modulated in accordance with external image signals, a polygonal mirror 12 for deflecting the modulated laser beam L to scan therewith the photosensitive drum 1 in the direction of the rotational axis, a driving motor 13 for rotating the polygonal mirror at a constant rotational speed, an f-θ lens 14 for imaging the deflected laser beam L on the surface of the photosensitive drum 1, and a reflection mirror 17 for deflecting the optical path.

The housing 10 is provided, partly opposed to the photosensitive drum 1, with an opening for allowing the laser beam L to emerge. The opening is sealed by a transparent parallel-plane plate, such as a glass plate, which functions as a dust proof plate for protecting the laser beam optical system within the housing 10 from the dust.

Further, a filter 16 may be disposed across the optical path of the laser beam L, when, for example, the amount of light is to be controlled.

In operation, the laser beam L modulated in accordance with the external image information signals, scans the photosensitive member, i.e., drum 1 at its surface which has been uniformly charged by the charger 2. By this scan, an electrostatic pattern is formed on the photosensitive drum 1 in accordance with the image signal. The electrostatic pattern is then visualized by the developing means 3. The visualized image is then transferred by the transfer charger 7 onto a transfer material fed from the feed cassette 4. The transfer material bearing a visualized image thereon is conveyed to the fixing means 8, whereat the image is fixed thereon. The transfer material is then discharged out. On the other hand, the residual developer remained on the photosensitive drum 1 is removed therefrom by cleaning means 9 to make it ready for the next image formation.

It has been found that the resultant images produced by the above-described apparatus sometimes have unintentional stripe patterns.

The inventor has been making detailed investigation on this problem, and finally found that the cause of this is the interference of the laser beam, which takes place in the parallel-plane plate of uniform thickness, such as the glass plate 15 and the filter 16, disposed across the optical path.

The cause which was found as a result of the investigation will be explained in detail in conjunction with FIG. 2, wherein the parallel-plane plate 15 (or 16) which is transparent for the laser beam L is shown as viewed in the direction of A for the dust proof glass plate 15 (or B for the filter 16). The laser beam L, which has been deflected by the polygonal mirror 12 (not shown in this Figure), is transmitted through the parallel-plane plate 15 (or 16) to the photosensitive drum 1. The laser beam L moves scanningly. In FIG. 3, the laser beam LA is shown as that at a certain instance. The laser beams LB and LC are shown as at the next instances in this order. The beams LA, LB and LC are transmitted through the plate 15 (or 16) as LA1, LB1 and LC1. Additionally, a part of each of the beams LA, LB and LC is reflected by the opposing surfaces of the plate 15 (or 16) and then transmitted therethrough as shown by reference characters LA2, LB2 and LC2. The beams LA1, LB1 and LC1 are interfered with LA2, LB2 and LC2, respectively due to the optical path length difference therebetween. When the optical path length difference between the transmitting beam LB1 and the reflected beam LB2, for example, is $m\lambda$ (m is an integer, and $\lambda$ is the wavelength of the laser beam), those beams are strengthened. When, on the contrary, the optical path difference is $(2m+\frac{1}{2})\lambda$, they are compensated.

When the laser beam deflects from the position shown by the beam LA to the position shown by the beam LC, the transmitting beam and the reflected beam are strengthened and compensated repeatedly to form a stripe pattern on the photosensitive drum 1.

SUMMARY OF THE INVENTION

It is the primary object of the present invention to provide a laser beam recording apparatus which can provide a clear and sharp image without the stripe resulting from the interference.

According to the present invention, the parallel-plane plate has a surface so arranged that the incident angle thereon is not zero throughout the scanning movement of the laser beam.

These and other objects, features and advantages of the present invention will become more apparent upon a consideration of the following description of the preferred embodiment of the present invention taken in conjunction with the accompanying drawings.

BRIEF DESCRIPTION OF THE DRAWINGS

FIG. 4 illustrates the fundamental idea of the present invention; and

FIG. 5 shows another embodiment of the present invention.

DESCRIPTION OF THE PREFERRED EMBODIMENTS

Figure 3:
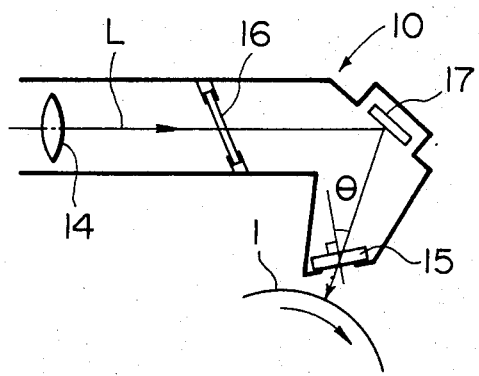
FIG. 3 shows the part of the laser beam printer with which the present invention is mainly concerned.

FIG. 3 shows a cross-section of the housing 10 and its internal structures of a laser beam recording apparatus according to an embodiment of the present invention. In the housing 10, the optical path of the laser beam L is not perpendicular to the beam transmitting surfaces of the dust proof glass 15 (a parallel-plane plate) or the filter 16 (another parallel-plane plate). In other words, the beam transmitting surfaces of the dust proof glass 15 and the filter 16 are inclined with respect to a plane perpendicular to a plane formed by the trace of the laser beam L deflected by the polygonal mirror 12 (not shown in FIG. 3).

The inclination will be explained in detail, referring to FIG. 4, wherein the dust proof glass 15 (or the filter 16) of FIG. 3 is shown in an enlarged scale in the same cross-section. The beam transmitting surfaces 15a and 15b of the dust proof glass plate (and the beam transmitting surfaces 16a and 16b) are parallel with each other.

It is assumed that the laser beam Li is incident on the dust proof glass plate 15 at the incident angle of $\theta$ (the angle formed between the laser beam and the normal line to the surface). Then, the following relationship is satisfied:

$$\sin \theta = n \cdot \sin \theta' \qquad (1)$$

where the refractive index of the glass is n and the angle of refraction is $\theta'$.

The beam Li is emergent, toward the photosensitive drum 1, from the glass plate 15 at an angle $\theta$ from the normal line C as shown by the reference character $Li_1$. The beam Li is partly reflected by the lower surface 15b of the plate 15 and then reflected by the upper surface 15a thereof, whereafter it is emergent from the glass plate 15 as the beam $Li_2$. The angle of reflection is $\theta'$ here.

The distance $\Delta S$ between the laser beams $Li_1$ and $Li_2$ measured on the surface of the photosensitive drum 1 is represented as follows:

$$\Delta S = 2t(\tan \theta' \cdot \cos \theta) \qquad (2)$$

From equations (1) and (2), the following results:

$$\Delta S = 2t \cdot \sin \theta \sqrt{1 - \sin^2 \theta} / (n \sqrt{1 - \sin^2 \theta})$$

It is assumed that $\theta$ is sufficiently small, then, $\sin \theta \approx \theta$, and, $1-\sin^2 74 = 1$.

So, the distance $\Delta S$ is expressed:

$$\Delta S = 2t\theta/n \qquad (3)$$

No interference takes place if the distance $\Delta S$ is larger than the diameter $\phi$ of the laser beam on the surface of the photosensitive drum 1, i.e., $\phi < \Delta S (=2t\theta/n)$. So, the condition for no interference is:

$$\theta > n\phi/2t \qquad (4)$$

As an example, when the dust proof glass has a thickness of 2 mm (=t) and the refractive index of 1.5 (=n), and the beam diameter of 100$\mu$ (=$\phi$) on the surface of the photosensitive drum 1, the interference can be completely avoided by making the angle $\theta$ equal to or larger than 2.2 degrees.

It has been experimentally found that, if the dust proof glass 15 or the filter 15 is provided with an anti-reflection coating, the inclination of 0.8 degree, which is smaller than the case without the coating, showed the interference prevention effect. It is considered that this is because the anti-reflection coating reduces the amount of the reflected beam so that the effective diameter thereof is reduced.

Thus, the interference can be prevented to provide a high quality and sharp image by inclining the beam transmitting surfaces of the parallel-plane plate, such as the dust proof glass plate 15 and the filter 16, with respect to the plane perpendicular to a plane formed by the trace of the laser beam.

Figure 1:
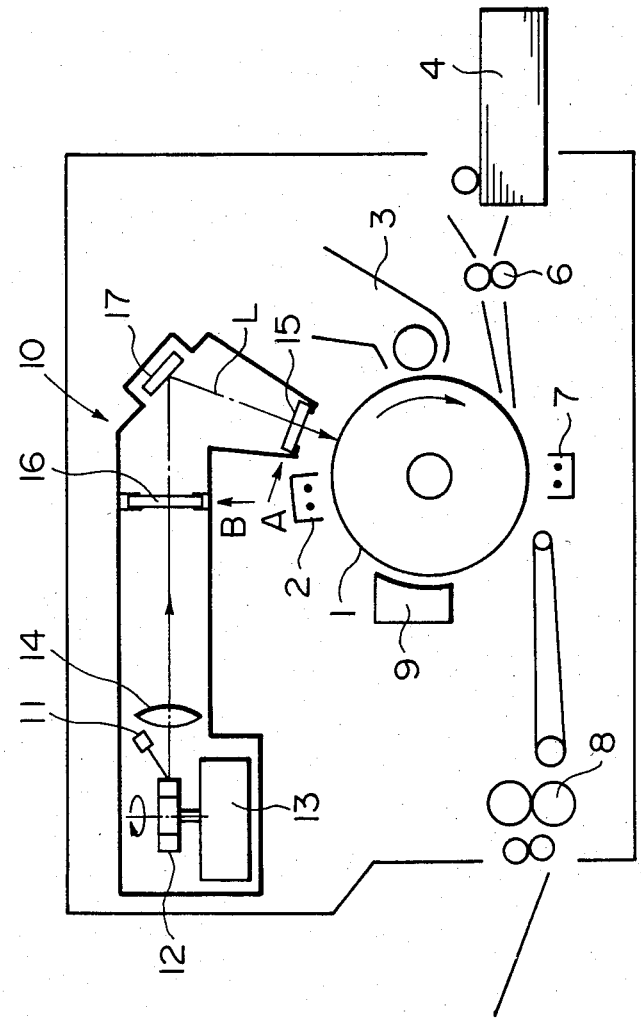
FIG. 1 is a cross-sectional view of a conventional laser beam printer.
Figure 2:
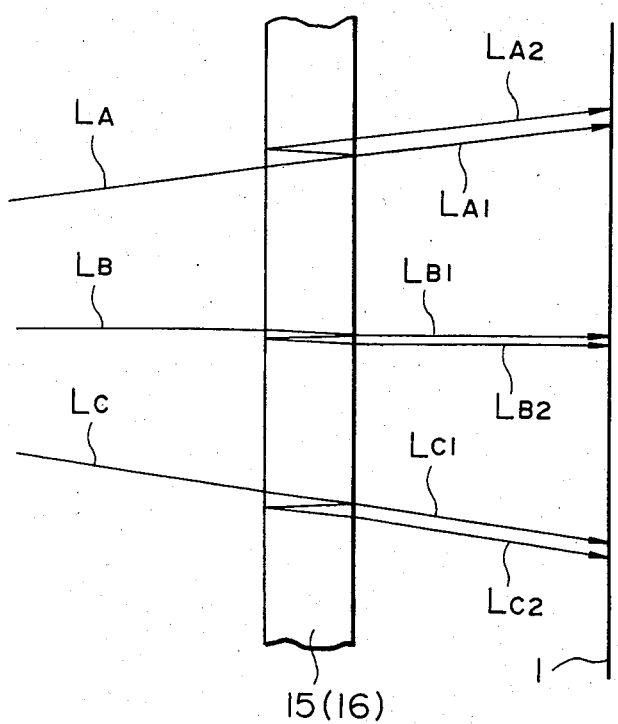
FIG. 2 shows the behavior of the laser beam, investigated by the inventor.

FIG. 5 shows another embodiment of the present invention, wherein the dust proof glass plate 15 is shown as seen in the direction A of FIG. 1, or the filter 16 is shown as seen in the direction B of FIG. 1. In this embodiment, the direction of the inclination of the parallel plane plate is different from that shown in FIGS. 3 and 4. The beam transmitting surfaces are so inclined that the angle of incidence thereon is not zero throughout the scanning deflection of the beam (LA-LB-LC), and also inclined with respect to the generating line of the photosensitive drum 1. In this embodiment, the angle $\theta$ between the beam transmitting surface and the generating line of the photosensitive drum 1 satisfies the equation (4) so that the same advantages as with FIG. 3 embodiment are provided.

While the invention has been described with reference to the structure disclosed herein, it is not confined to the details set forth and this application is intended to cover such modifications or changes as may come within the purpose of the improvements or the scope of the following claims.

What is claimed is:

1. A laser beam recording apparatus, comprising:
   a photosensitive member movable in a first direction along an endless path;
   means for producing a laser beam modulated in accordance with image information to be recorded;
   means for moving the laser beam in a second direction to scan said photosensitive member across a predetermined width and expose said photosensitive member to a laser beam wherein said moving laser beam traces an optical path; and
   a member transparent to the laser beam disposed in a portion of the optical path extending between said photosensitive member and said moving means so that no member transparent to the laser beam disposed in that portion of the optical path comes between said transparent member and said photosensitive member, said transparent member being inclined to avoid a zero angle of incidence with the laser beam over the entire scan width that the laser beam is incident on said transparent member.

2. An apparatus according to claim 1, wherein said means for moving the laser beam is a polygonal mirror.

3. An apparatus according to claim 1, wherein said transparent member is inclined with respect to a tangential plane including a scanning line on said photosensitive member on which the laser beam is focused.

4. An apparatus according to claim 1, wherein the surface of said transparent member has an anti-reflection coating.

5. A laser beam recording apparatus, comprising:
   a photosensitive member movable in a first direction along an endless path;
   means for producing a laser beam modulated in accordance with image information to be recorded;
   means for moving the laser beam in a second direction to scan said photosensitive member within a predetermined width and expose said photosensitive member to a laser beam wherein said moving laser beam traces an optical path;

a housing for accommodating the said laser beam producing means and said laser beam moving means; and a parallel-plane plate transparent to the laser beam, said parallel-plane plate being disposed in the optical path at a position where the laser beam emerges from said housing and being effective to prevent dust from entering said housing, said parallel-plane plate being positioned in the optical path so that no member transparent to the laser beam comes between said transparent member and said photosensitive member, wherein said parallel-plane plate is inclined to avoid a zero angle of incidence with the laser beam over the entire scan width that the laser beam is incident on said parallel-plane plate.

6. An apparatus according to claim 5, wherein said means for moving the laser beam is a polygonal mirror.

7. An apparatus according to claim 5, wherein said parallel-plane plate is inclined with respect to a tangential plane including a scanning line on said photosensitive member on which the laser beam is focused.

8. An apparatus according to claim 5, wherein the surface of said parallel-plane plate has an anti-reflection coating.

9. A laser recording apparatus, comprising:

a photosensitive member movable in a first direction along an endless path;

means for producing a laser beam modulated in accordance with image information to be recorded;

means for moving the laser beam in a second direction to scan said photosensitive member across a predetermined width and expose said photosensitive member to a laser beam wherein said moving laser beam defines a trace of an optical path;

a sensitizing charger for uniformly charging said photosensitive member;

means for developing an image on said photosensitive member;

an image transfer charger for transferring a developed image onto a transfer material;

a cleaner for cleaning said photosensitive member, wherein said sensitizing charger, developing means, image transfer charger and cleaner are disposed around said photosensitive member in the order named;

a housing for accommodating the laser beam producing means and said laser beam moving means; and a parallel-plane plate transparent to the laser beam, said parallel-plane plate being disposed at a position in the optical path where the laser beam emerges from said housing and being effective to prevent dust from entering said housing, wherein said parallel-plane plate is inclined to avoid a zero angle of incidence with the laser beam over the entire scan width that the laser beam is incident on said parallel-plane plate;

wherein said parallel-plane plate is positioned in the optical path between said sensitizing charger and said developing means, and the laser beam emergent from said parallel-plane plate is directly incident on said photosensitive member.

10. An apparatus according to claim 9, wherein said means for moving the laser beam is a polygonal mirror.

11. An apparatus according to claim 9, wherein said parallel-plane plate is inclined with respect to a tangential plane including a scanning line on said photosensitive member on which the laser beam is focused.

12. An apparatus according to claim 9, wherein the surface of said parallel-plane plate has an anti-reflection coating.

* * * * *